United States Patent [19]

Morita et al.

[11] Patent Number: 4,642,270
[45] Date of Patent: Feb. 10, 1987

[54] MAGNETIC RECORDING MEDIUM

[75] Inventors: Haruyuki Morita; Jiro Yoshinari; Kazumasa Fukuda, all of Tokyo, Japan

[73] Assignee: TDK Corporation, Tokyo, Japan

[21] Appl. No.: 675,302

[22] Filed: Nov. 27, 1984

[30] Foreign Application Priority Data

Nov. 29, 1983 [JP] Japan ................. 58-223069

[51] Int. Cl.$^4$ ........................................... H01F 10/00
[52] U.S. Cl. ................................... 428/621; 427/131; 427/132; 428/694; 428/626; 428/637; 428/666; 428/667; 428/679
[58] Field of Search ............... 428/621, 626, 637, 666, 428/694, 667, 679; 427/131, 132

[56] References Cited

FOREIGN PATENT DOCUMENTS 52-118424  3/1977  Japan .
57-208631 12/1981  Japan .
58-91      1/1983  Japan .

Primary Examiner—Veronica O'Keefe
Attorney, Agent, or Firm—Oblon, Fisher, Spivak, McClelland & Maier

[57] ABSTRACT

In a magnetic recording medium comprising a nonmagnetic substrate and a magnetic thin film formed on the surface thereof and including at least two layers, the upper layer in the form of a crystalline cobalt-chromium alloy layer suitable for perpendicular magnetization is placed on the lower layer in the form of an amorphous layer of permalloy having high permeability and low coercive force.

5 Claims, 3 Drawing Figures

MAGNETIC RECORDING MEDIUM

The present invention relates to a magnetic recording medium comprising a multilayer magnetic thin film formed on a non-magnetic substrate. More specifically, it relates to a perpendicular recording medium having improved surface smoothness and orientation.

BACKGROUND OF THE INVENTION

Over the past few years, several "perpendicular recording media" so called because the recording medium is magnetized perpendicular to the surface of its magnetizable thin film, have been proposed for increasing the density of magnetic recording. Japanese Patent Publication No. 58-91 discloses one perpendicular recording medium comprising a polyimide substrate and a two-layer magnetic thin film thereon, one layer on the substrate being a low-coercive force layer of molybdenum/iron/nickel and the other layer thereon being a magnetic recording layer of cobalt/chromium. Magnetic thin films of this two-layer structure type provide a number of advantages. Since the magnetic circuit on the back surface of the perpendicularly magnetizable cobalt/chromium film is partially closed by the high permeability, low coercive force magnetic layer, magnetic deterioration is minimized and residual magnetization is enhanced.

Magnetic thin films having the overall desired properties can be obtained by making the magnetic thin film a multilayer structure consisting of layers with different properties.

It has hitherto been the practice to form a magnetic thin film having such a two-layer structure by heating the non-magnetic substrate to temperatures above room temperature (250° C. in examples described in Japanese Patent Publication No. 58-91), forming a low coercive force, high permeability magnetic layer thereon by sputtering, and further forming a magnetic recording layer of cobalt/chromium thereon by sputtering. The low coercive force, high permeability magnetic layer formed by this process is a polycrystalline structure in which various crystal faces including (110), (111), and (100) are exposed on its surface. If a magnetic recording layer destined for perpendicular magnetization is formed on the polycrystalline high-permeability magnetic layer, the irregular crystal faces on the surface of the underlying magnetic layer will affect the overlying magnetic recording layer being formed particularly at the initial stage of the process, resulting in local variations of the crystal growth of the magnetic recording film. More specifically, crystal growth on (111) faces is promoted, but growth on other faces is retarded. This results in the disordered crystal growth and orientation of the magnetic recording layer with deteriorated surface planarity.

SUMMARY OF THE INVENTION

An object of the present invention is to provide a magnetic recording medium comprising a thin film of a multi-layer structure having improved surface smoothness and orientation.

According to the present invention, there is provided a magnetic recording medium comprising a non-magnetic substrate and a magnetic thin film formed on the surface thereof. The magnetic thin film includes at least one crystalline layer and at least one amorphous layer. Preferably the crystalline layer is contiguous to the amorphous layer which is located closer to the substrate. In one preferred embodiment, the layers are metallic, and most preferably, the amorphous layer is a permalloy film and the crystalline layer is a cobalt-chromium film.

DETAILED DESCRIPTION OF THE INVENTION

Figure 1:
FIGS. 1 and 3 are micrographs (X125) showing the surface structure of the magnetic thin films prepared in Examples 1 and 2 according to the present invention.

It is essential to the present invention that at least one layer of the multi-layer magnetic thin film be amorphous. Unlike polycrystalline films in which various crystal faces are exposed on the film surface, amorphous films have a uniform surface. When a crystalline film is formed on top of such an amorphous film, the crystalline film being formed is almost entirely free of influence from the underlying film. Because of no local variations in crystal growth, a film having excellent surface smoothness is obtained in which the orientation of crystal growth is orderly.

In one preferred embodiment of the invention, a perpendicular or vertical recording medium is prepared by forming an amorphous magnetic layer having low coercive force and high magnetic permeability on the surface of a non-magnetic substrate, and forming a perpendicularly magnetizable layer on top of the amorphous layer. The magnetic layer having low coercive force and high permeability may be formed using an alloy such as Permalloy, Alperm, and Sendust, various types of ferrites, amorphous alloys, or the like. The permalloy is especially desirable because of its high magnetic permeability.

Amorphous magnetic layers with a low coercive force and high permeability may be formed by sputtering or vacuum deposition while cooling the substrate, or by plating or chemical vapor deposition (CVD). The object of the present invention may also be achieved by first forming a crystalline magnetic film with low coercive force and high permeability, and then subjecting the surface to ion implantation to convert it into an amorphous surface layer.

Liquefied gas or other refrigerant may be used to cool the substrate in the present invention, with liquid nitrogen being especially desirable.

To obtain the effects and advantages of the present invention, the amorphous film should have a thickness of at least about 100 Å.

In the ion implantation process, a polycrystalline magnetic film having low coercive force and high magnetic permeability is first formed by sputtering or some other process. Ions are then implanted in the film surface. The energy of this ion implantation process disrupts the crystal arrangement in a surface layer of the film, causing amorphitization. There are no restrictions on the type of ions implanted, but implanting ions with large ionic radii such as $Ar^+$ and $N_2^+$ is effective. The number of ions implanted may be $10^{14}$–$10^{17}$ per square centimeter, and an acceleration voltage during ion implantation of from several tens to several hundreds of kilovolts is desirable. Although there are no particular limitations on the thickness of the surface layer to be amorphitized, the effects of the present invention can be best achieved by amorphitization to a thickness of the order of 100 Å.

Alloys such as cobalt-chromium (Co-Cr), cobalt-vanadium (Co-V), cobalt-phosphorus (Co-P) and the like may be used as the perpendicular magnetizing film. The use of cobalt-chromium is desirable because the perpendicular anisotropy is easily controllable. The crystalline perpendicular magnetizing film may ordinarily be obtained by returning the temperature of the substrate having the amorphous film formed to room temperature or above, and then forming a film of cobalt-chromium or similar alloys on top of the amorphous film by sputtering, vacuum deposition, plating, plasma CVD, or some other process.

In the present invention, whether the film is crystalline or amorphous may be determined by X-ray diffraction, electron diffraction, or some other analysis.

The present invention is not limited to the embodiment described above, and can be applied to a variety of magnetic layers. Moreover, it is capable of providing magnetic recording media having a multi-layer magnetic thin film with improved surface smoothness and orientation.

Examples of the present invention are presented below by way of illustration and not by way of limitation.

EXAMPLE 1

A substrate in the form of a 50 $\mu$m thick polyimide film mounted on a holder was placed in a vacuum chamber, which was evacuated to $2\times10^{-6}$ Torr. Argon was than introduced to a pressure of $5\times10^{-3}$ Torr, and the substrate cooled to 77° K. with liquid nitrogen. A Permalloy was RF sputtered for 10 minutes with a power of 200W to form a permalloy film on the substrate. The permalloy film thus obtained had a composition of Fe:Ni:Mo of 17:78:5 by weight, a thickness of 0.5 $\mu$m, a coercive force Hc of 0.1 Oe, and a maximum magnetic permeability $\mu_m$ of 150,000. The X-ray analysis of this permalloy film showed no peaks representing crystal faces, indicating that the film was amorphous.

Next, the substrate temperature was returned to room temperature. A cobalt-chromium alloy was sputtered under the same conditions as above to form a cobalt-chromium alloy film on top of the amorphous permalloy film. The cobalt-chromium alloy film obtained had a ratio by weight of cobalt to chromium of 80:20. The two-layer magnetic thin film consisting of the permalloy film and the cobalt-chromium alloy film had a total thickness of 1.0 $\mu$m, a perpendicular coercive force Hc of 500 Oe, and a saturation magnetization Ms of 390 G. X-ray analysis of this two layer film showed that the cobalt-chromium [001] axis was oriented perpendicular to the film surface. The locking curve of the hcp (002) face was determined to have a half-value width $\Delta\theta_{50}$ of 3°. As shown in the micrograph in FIG. 1, the surface of this film is flat and smooth.

COMPARATIVE EXAMPLE 1

A permalloy film layer was formed under the same conditions as in Example 1, except that the substrate temperature during formation of the permalloy film was set at room temperature. The permalloy film obtained had a thickness of 0.5 $\mu$m, a coercive force Hc of 0.2 Oe, and maximum magnetic permeability $\mu_m$ of 150,000. X-ray diffraction studies of this permalloy film showed peaks representing crystal faces, indicating that the film was polycrystalline.

Figure 2:
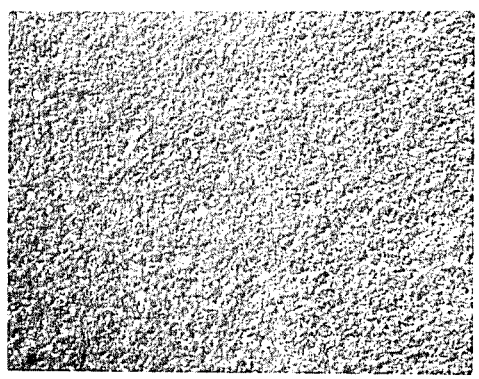
FIG. 2 is a micrograph (X125) showing the surface structure of the magnetic thin film prepared in Comparative Example 1.

Next, a cobalt-chromium alloy film was formed on top of this polycrystalline permalloy film as in Example 1. The two-layer magnetic thin film consisting of the permalloy film and the cobalt-chromium film had a total thickness of 1.0 $\mu$m, a perpendicular coercive force Hc of 400 Oe, and a saturation magnetization of 400 G. This magnetic film had a locking curve half-value width $\Delta\theta_{50}$ of 12°, which greatly disrupts the orientation of cobalt-chromium crystals. The surface of this film is irregular as can be seen in the micrograph in FIG. 2.

EXAMPLE 2

A substrate in the form of a 50 $\mu$m polyimide film mounted on a holder was placed in a vacuum chamber, which was evacuated to $2\times10^{-6}$ Torr. Argon was then introduced to a pressure of $5\times10^{-3}$ Torr, and the substrate heated to 100° C. Permalloy RF sputtered for 10 minutes with a power of 200W to form a permalloy film on the substrate. The permalloy film thus obtained had a composition of Fe:Ni:Mo of 17:78:5 by weight, a thickness of 0.5 $\mu$m, a coercive force Hc of 0.1 Oe, and a maximum magnetic permeability $\mu_m$ of 150,000. The X-ray analysis of this permalloy film showed peaks representing crystal faces, indicating that the film was polycrystalline.

Next, the substrate having the permalloy film formed was set up in an ion implantation unit, and $1\times10^{16}$ $N_2^+$ ions implanted per square centimeter at an acceleration voltage of 50 kV. After ion implantation, the permalloy film was examined by electron diffraction to find that the surface layer had amorphitized.

Figure 3:
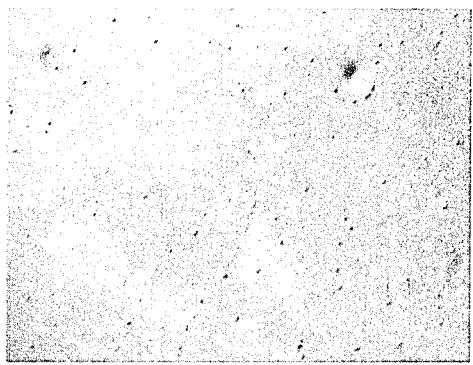

Next, a cobalt-chromium alloy was sputtered under the same conditions as during formation of the permalloy film to form a cobalt-chromium alloy film on the permalloy film that had undergone surface amorphitization. The cobalt-chromium alloy film thus obtained had a weight ratio of cobalt to chromium of 80:20. The two-layer magnetic thin film consisting of the permalloy film and the cobalt-chromium alloy film had a total thickness of 1.0 $\mu$m, a perpendicular coercive force Hc of 500 Oe, and a saturation magnetization Ms of 390 G. X-ray diffraction studies of this two-layer film reveal that the cobalt-chromium [001] axis is oriented perpendicular to the film surface. The locking curve of the hcp (002) face was found to have a half-value width $\Delta\theta_{50}$ of 3°. As shown in the micrograph in FIG. 3, the surface of this film was flat and smooth.

The magnetic thin film has a thickness of not more than about 10 $\mu$m in the practice of the present invention.

What is claimed is:

1. In a magnetic recording medium comprising a non-magnetic substrate and a magnetic thin film formed on the surface thereof, wherein the improvement comprises a magnetic thin film which is comprised of two layers, a first, crystalline layer deposited on said substrate, the surface opposite said substrate being amorphitized to give an amorphous surface, and a second crystalline layer deposited on said amorphous surface.

2. The magnetic recording medium according to claim 1 wherein the layer having an amorphous surface is a magnetic layer having a low coercive force and a high magnetic permeability, and the crystalline layer is a perpendicularly magnetizing layer.

3. The magnetic recording medium according to claim 1, or 2 wherein the layers are metallic.

4. The magnetic recording medium according to claim 3 wherein the amorphous layer is of a permalloy and the crystalline layer is of a cobalt-chromium alloy.

5. The magnetic recording medium according to claim 1 wherein the amorphous surface of said first layer has a thickness of at least 100 angstrom.

* * * * *